Aug. 3, 1965     L. A. SMITH     3,197,876
LINEAR MEASURING DEVICE
Filed May 14, 1962     4 Sheets-Sheet 1

LLOYD A. SMITH
INVENTOR.

BY Allan M. Shapiro

ATTORNEY

Aug. 3, 1965   L. A. SMITH   3,197,876
LINEAR MEASURING DEVICE
Filed May 14, 1962   4 Sheets-Sheet 2
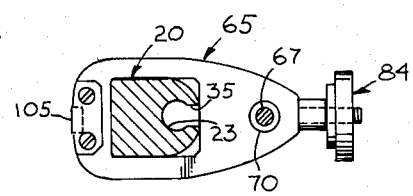
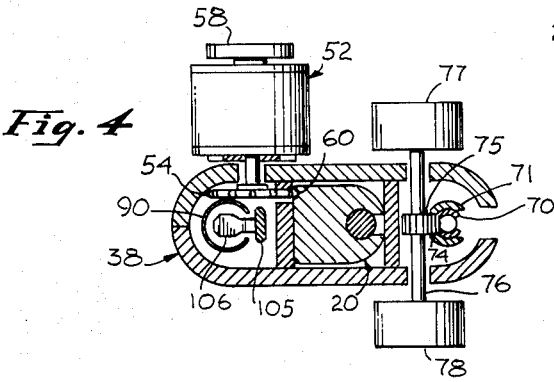
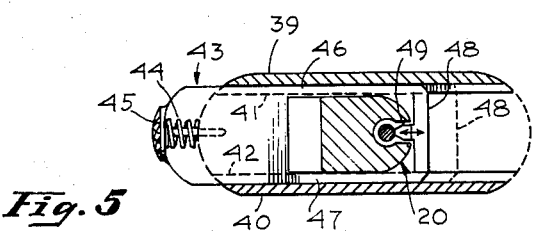
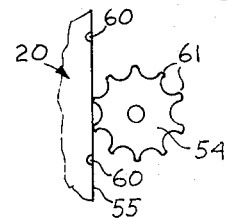
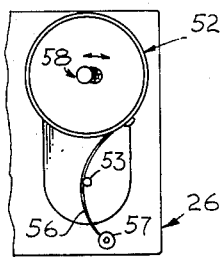
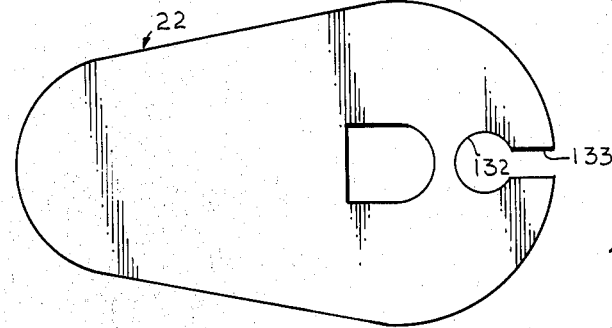
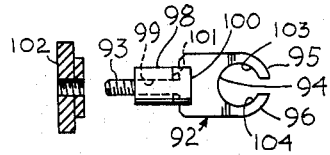
LLOYD A. SMITH
INVENTOR.
BY Allan M. Shapiro
ATTORNEY Aug. 3, 1965 L. A. SMITH 3,197,876
LINEAR MEASURING DEVICE
Filed May 14, 1962 4 Sheets-Sheet 3

INVENTOR.
LLOYD A. SMITH
BY Allan M. Shapiro
ATTORNEY

Aug. 3, 1965  L. A. SMITH  3,197,876
LINEAR MEASURING DEVICE
Filed May 14, 1962  4 Sheets-Sheet 4
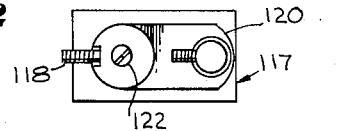
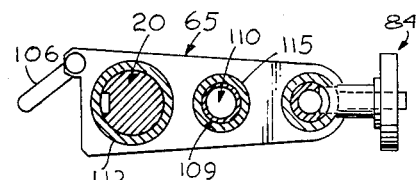
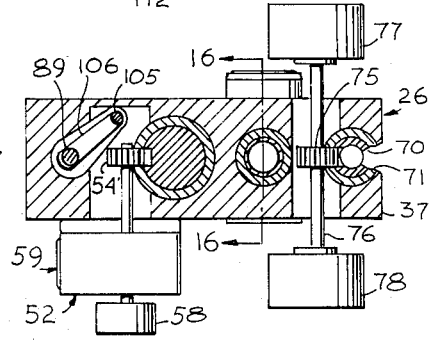
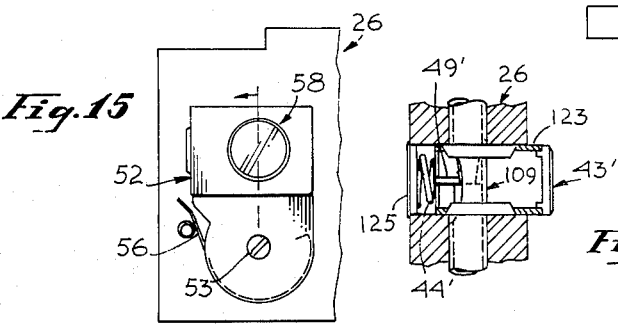
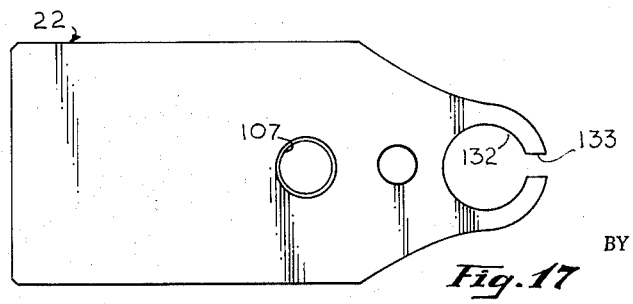
LLOYD A. SMITH
INVENTOR.
BY Allan M. Shapiro
ATTORNEY United States Patent Office 3,197,876
Patented Aug. 3, 1965

3,197,876
LINEAR MEASURING DEVICE
Lloyd A. Smith, 13411 Riverside Drive, Apt. B,
Sherman Oaks, Calif.
Filed May 14, 1962, Ser. No. 194,459
1 Claim. (Cl. 33—169)

The present invention relates to linear measuring devices and, more particularly, to a direct reading guage for measuring linear distances.

In the past, there have been many devices developed for specific requirements involved in measuring linear distances. Although there are many complex and expensive devices capable of extreme accuracy, such devices have been primarily utilized in laboratories and installations for maintaining quality control on prototype and production specifications. However, the major need for measuring devices resides in the machine shop where each individual operator requires the availability of a simple, inexpensive and fairly accurate guage of small size, ready adaptability to different configurations to be measured, and ease of operation. Obviously, because of the large number of measuring devices required in any machine shop, such devices are only suitable if they are inexpensive and, therefore, the more expensive types are economically unfeasible, even though they may be highly accurate. Hence, many devices have been developed which satisfy the criterion of low cost, but such devices have failed to meet one or more of the criteria of small size, relatively high accuracy, simplicity and ease of operation, adaptability to measurement of distances between portions of variously configurated objects, reliability, consistency of operation and standards of measurement, generally positive design to prevent breakdown of structural components, and minimization of failures due to improper or inexperienced operation.

Therefore, it is one of the objects of the present invention to provide a new and improved linear measuring device.

Another object of the present invention is the provision of a linear measuring device that is inexpensive and accurate for use in machine shops.

Further objects of the present invention include the provision of a linear measuring device which meets the criteria of small size, simplicity and ease of operation, adaptability to measurement of distances between portions of variously configurated objects, reliability, consistency of operation and standards of measurement, generally positive design to prevent breakdown of structural components, and minimization of failures due to improper or inexperienced operation.

Additional and related objects include the provision of a linear measuring device with a plurality of interchangeable portions adapted for assisting in the measurement of distances between portions of variously configurated objects.

A still further and additional object is the provision of a linear measuring device with novel attaching and locking means for selectively variable relative positioning various indicating portions of the device in accordance with desired reference characteristics.

Another object of the present invention is the provision of novel lock means for selective engagement and disengagement with a slidable member, such as a tube or rod, at any portion along the length thereof without causing an indentation or other marring of the surface of such slidable member so as to permit effectively infinite positional resolution of engagement in spite of long continued use of the device.

According to the present invention, there is provided a linear measurement device comprising housing means mounted on support means in rectilinearly slidable relationship thereto, reference means having a plurality of equally spaced registration means for selectively providing referenced support of the housing means at a corresponding member of positions spaced in accordance with relatively large increments of positional variations, dial means for presenting visible indicia corresponding to the registered position of such housing means with respect to the reference means, pointer means slidably mounted with respect to the housing means in a manner such that the pointer means may be moved either or both with the housing means and/or relative to the housing means but always parallel to the reference means, dial indicator means secured to the housing means and having deflectible means operable in a direction parallel to the reference means, and a cross member selectively securable to the pointer means and having projection means engabeable with the deflectible means whereby relative movement of the pointer means with respect to the housing means causes actuation movement of the deflectible means for operating the dial indicator to indicate relatively small measurements of motion of the pointer means, whereby arithmetic addition and/or subtraction of the values indicated by the dial means and the dial indicator means produces direct linear measurement readings.

In accordance with a preferred embodiment of the present invention, the support means comprises a long bar or tube member and a flat base plate secured to one end of the bar so that the support means may stand vertically erect by itself. The bar is provided with a vertical bore within which a plurality of equal-length reference elements are sequentially disposed on top of each other. The bar is provided with a vertical slot on one side which communicates with the bore to permit lateral access to the reference elements. The housing means is slidably mounted on the bar for rectilinear movement along the length thereof and is provided with a selectively movable dog for insertion through the vertical slot access to the bore for selective engagement and disengagement with respect to the reference elements, whereby the housing means is selectively positionable along the length of the bar in accordance with the large incremental reference positions of the reference elements.

In another embodiment of the present invention, the reference means comprises a separate tube parallel to the main support bar for containing the reference elements. In either embodiment, the reference elements may be either a plurality of separate pieces of identical lengths or a single rod having a plurality of equally spaced notches or steps therein. In all cases, the reference means permits selective positioning of the housing means with respect to the support means in accordance with large incremental steps of linear motion of the housing means with respect to the work object to be measured.

Further in accordance with the present invention, dial indicator means are mounted on the housing means for movement therewith and comprise deflectible means for actuation of the dial indicator in a direction parallel to the reference means. Pointer means are slidably mounted on the housing means and selectively lockable with respect thereto for movement with the housing means during positional variations of the housing means with respect to the reference means. A cross member is selectively secured to the pointer means and is provided with projection means engageable with the deflectible means of the dial indicator whereby movement of the pointer means relative to the housing means causes corresponding proportional deflection of the deflectible means for causing corresponding indicator movement of the dial indicator means.

The features of the present invention which are believed to be novel are set forth with particularity in the appended claim. The present invention both as to its organization and manner of operation, together with further objects and advantages thereof, may best be understood by reference to the following description, taken in connection with the accompanying drawings, in which:

FIGURE 3 is a fragmentary top plan view, partially in section, showing the cross member and the means for securing the pointer rod to the cross member;

FIGURE 4 is a top plan view, partially in section, as seen along line 4—4 in FIGURE 1;

FIGURE 5 is a horizontal sectioned view as seen along line 5—5 in FIGURE 2;

FIGURE 6 is a top plan view of the base member alone;

FIGURE 7 is a fragmentary side elevation view of the dial pinion and separate dial registration notches in the support means;

FIGURE 8 is a fragmentary side elevation view of the dial;

FIGURE 9 is an exploded plan view of the locking means for securing the dial indicator to the housing means;

FIGURE 12 is a fragmentary top plan view showing the upper portions of the columns of the device shown in FIGURE 10;

FIGURE 13 is a fragmentary top plan view showing the cross member and an actuating foot for the dial indicator of the device shown in FIGURE 10;

FIGURE 14 is a horizontally sectioned view as seen along line 14—14 in FIGURE 10;

FIGURE 15 is a fragmentary side elevation view showing the dial means of the device shown in FIGURE 10;

FIGURE 16 is a fragmentary elevation view, partly in section, as seen along line 16—16 in FIGURE 14;

FIGURE 17 is a top plan view of the base member alone shown in FIGURE 10; and

FIGURE 18 is an elevation view of a modified form of pointer means adapted for use with either one of the illustrated embodiments of the present invention.

Figures 1, 2:
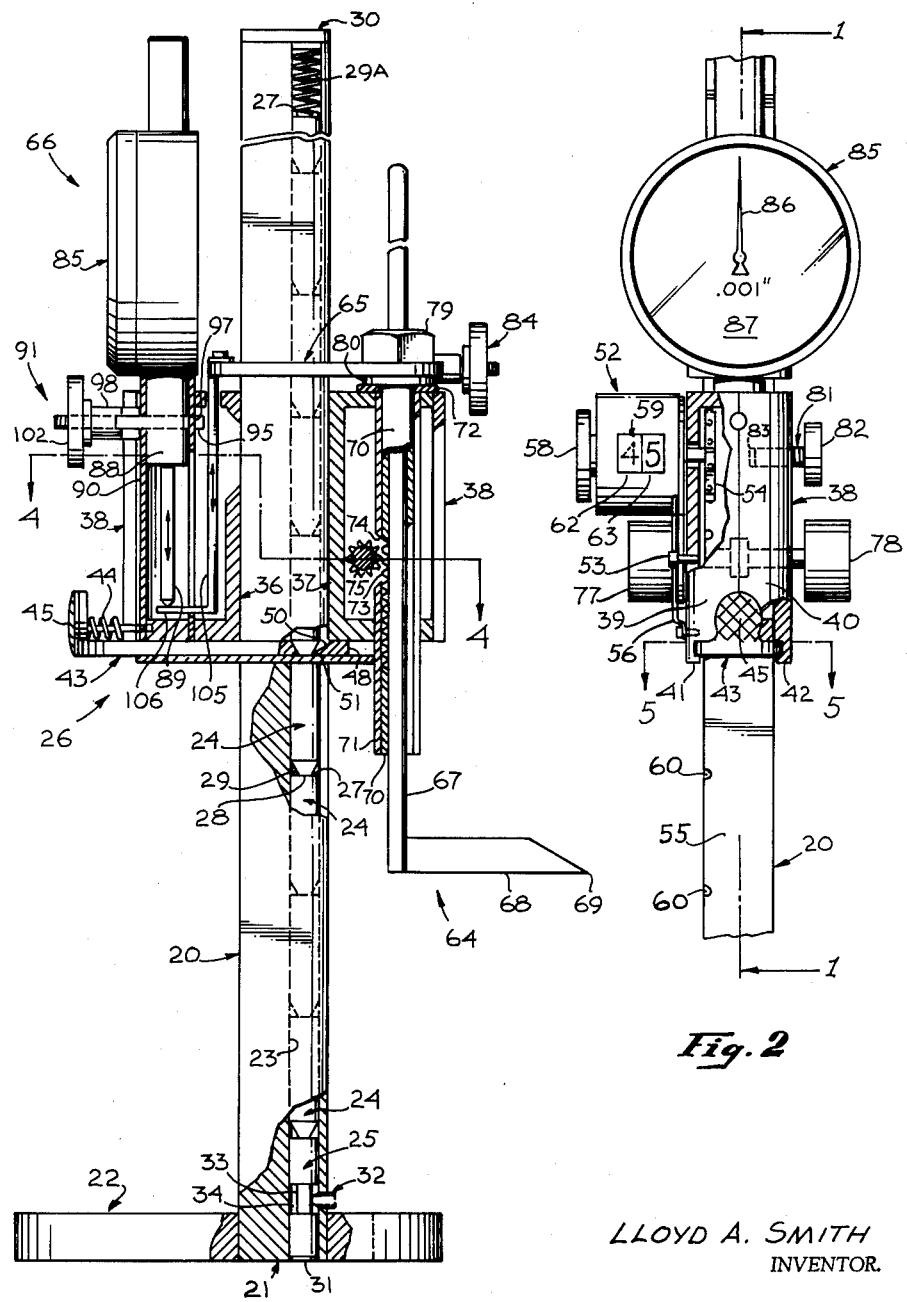
FIGURE 1 is a side elevation view of a preferred embodiment of the present invention, partly broken away and sectioned as seen along line 1—1 in FIGURE 2.
FIGURE 2 is a front elevation view of the device as shown in FIGURE 1.
Figures 10, 11:
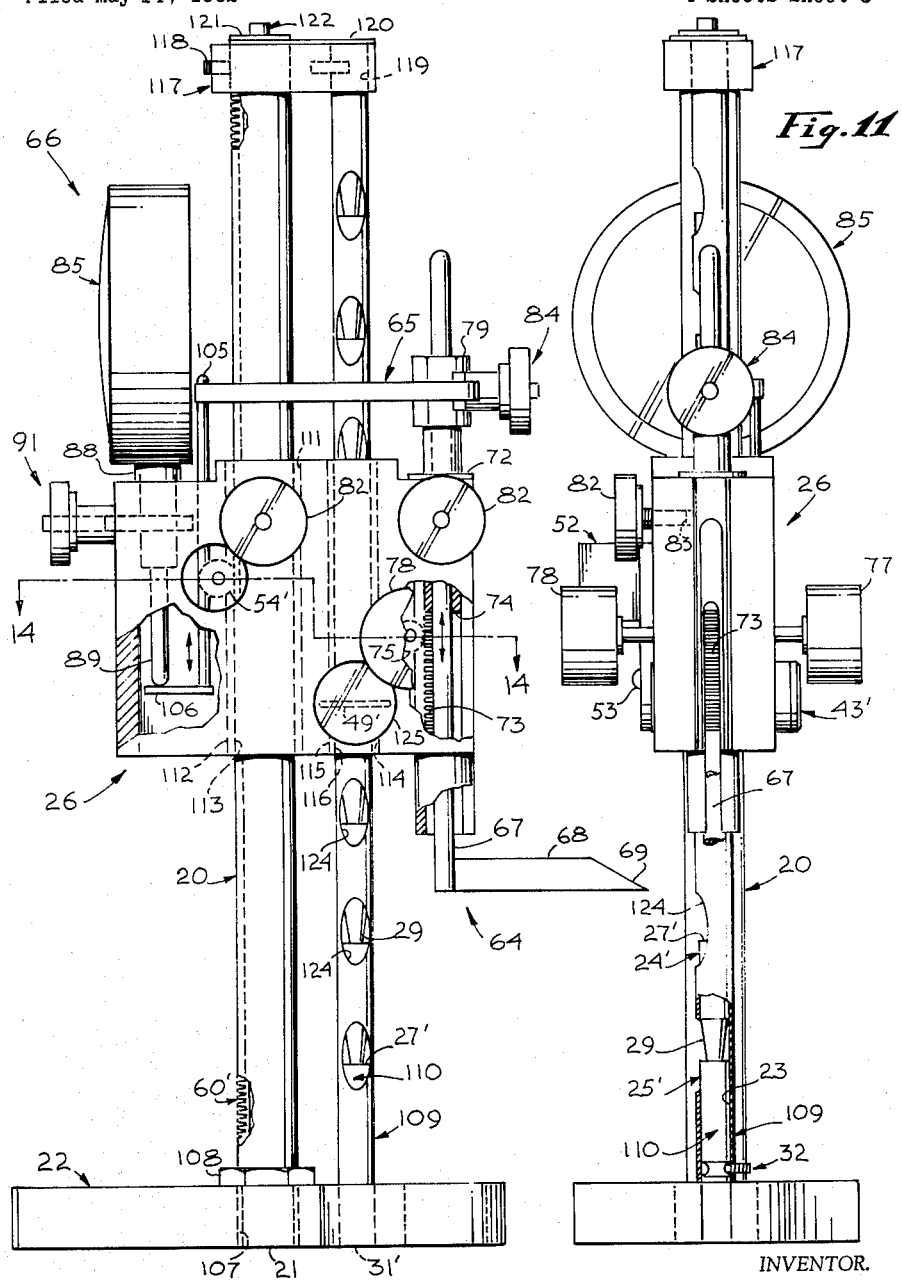
FIGURE 10 is a side elevation view of another embodiment of the present invention, partly broken away and sectioned.
FIGURE 11 is a rear elevation view of the device shown in FIGURE 10.

Referring to the drawings, and particularly to the embodiment illustrated in FIGURES 1 through 9, there is seen a structural column 20 which is welded or otherwise secured at its bottom end 21 to a base plate 22 at right angles thereto so that the device may stand by itself upon the base plate 22 with the column 20 in a vertically erect position. The column 20 is provided with a longitudinal bore 23 within which are contained the longitudinally incremental reference means comprising a plurality of reference elements, such as 24 and 25, disposed on top of each other. With the exception of the bottom reference element 25, each of the reference elements 24 is identical to each of the others and, in the embodiment illustrated, is preferably one inch in length to provide one inch incremental steps in the positions of the housing means, indicated generally at 26, with respect to the reference means. The reference elements 24 and 25 may be made of dowel pins to have a circular cross section and each is provided with a flat top surface 27 and a flat bottom surface 28, the later surface having a reduced diameter as a result of the conical chamfer 29 to permit access to the top surface 27 of the reference elements 24 or 25 next therebelow.

The bottom reference element 25 may be of any convenient length and, in fact, such length need be neither precise nor known, it being important in the operation of the device only that the length of the reference elements 24 be precise and known, and that the length of all of the reference elements 24 and 25 remain the same during any particular operation of measurement. All of the reference elements 24 and 25 are freely slidable within the bore 23 and are urged in a generally downward direction by a coil spring 29A compressed between a cover plate 30 and the top surface 27 of the uppermost reference element 24. Thus, the bottom surface 31 of the bottom reference element 25 is urged downwardly and outwardly from the bore 23 so as to extend below the bottom of the base plate 22 in the absence of an object therebelow. A retaining screw 32 is threaded through the support column 20 into the space 33 formed by an annular groove in the reference element 25. The retaining screw 32 does not engage the reduced diameter portion 34 of the reference element 25 but merely acts as an obstruction to prevent the reference element 25 from dropping out of the bore 23. The column 20 is provided with a longitudinal slot 35 (see FIGURE 3) along its entire length to permit registration access to the reference elements 24 and 25, as will be more fully explained later.

The housing 26 comprises a pair of U-shaped blocks 36 and 37 disposed on opposite sides of the column 20 and rigidly mounted to the casing 38 which comprises a pair of opposing and mating shells 39 and 40. The shells 39 and 40 have respective L-shaped bottom terminations 41 and 42 to provide a channel for laterally slidable movement of a manually operated housing lock 43 retained therein. The lock 43 is normally maintained in the leftward direction (FIGURE 1) by a spring 44 abutting against a finger button 45. The lock 43 is in the form of a yoke with a pair of lateral arms 46 and 47 (FIGURE 5) provided commonly at their ends with a crossbar 48 having an inwardly directed locking tip or dog 49 for insertion through the longitudinal slot 35 to make registration engagement with the reference elements 24 and 25. The locking dog 49 has a chamfered top surface 50 to permit as great an insertion as possible under the conical chamfer 29, and has a flat bottom surface 51 for resting upon the flat top surface 27 of the reference elements 24 and 25. In the locked position shown in FIGURE 1, all of the weight of the housing 26, and the various elements carried thereby, is transmitted by the locking dog 49 to the surface 27 of the reference element 24 next therebelow and, consequently, to all of the next lower reference elements 24 and the bottom reference element 25 so that the bottom surface 31 of the latter is forced outwardly and downwardly against a gage block (not shown) or any other structural element rigidly related to the workpiece (not shown) with respect to which the measurements are to be made. Thus, by depressing finger button 45 so as to move crossbar 48 to the right (as seen in dash line configuration in FIGURE 5), the locking dog 49 is released from engagement with the reference elements 24 so that the housing 26 and all of the elements carried thereby become freely slidable in both the upward and downward longitudinal directions with respect to the column 20 and its reference means and, upon release of the housing lock 43 at any selected incremental position of the housing 26 in the longitudinal direction, the locking dog 49 registers with the top surface 27 of the reference element 24 next therebelow. Due to the weight of the housing 26 and all of the other elements resting upon the reference elements, the end 31 of the bottom reference element 25 becomes referenced against a gage block or other structural element fixedly related to the workpiece, thus causing the housing 26 to become referenced to the workpiece. Incremental referenced variations in the position of the housing 26 with respect to such workpiece are accomplished by merely moving the housing 26 longitudinally to any selected one of the registration positions with the reference elements 24, each such reference element constituting an incremental measurement of one inch in the embodiments illustrated.

In order to provide convenient visual indications of the longitudinal position of the housing 26 with respect to the reference means and, consequently indicate the number of one inch incremental measurements, there is provided dial means comprising a dial 52 of any type well known in the art which is mounted by a pivot pin 53 to the housing 26 and is provided with a driven wheel or pinion 54 positioned to radially abut against the front surface 55 of the column 20. A leaf spring 56 has one end anchored at 57 to the housing 26 and engages the dial 52 in a direction to urge the pinion wheel 54 against the surface 55. An adjustment knob 58 is provided to reset the numerical indicia 59 of the dial 52 as desired, the spring 56 permitting pivoting of the dial 52 and its wheel 54 away from its engaged position against the surface 55 during such adjustment. The surface 55 of the column 20 is provided with notches 60 at one inch intervals, such notches being located at positions generally corresponding to the reference elements 24 so that a tooth 61 of the pinion wheel 54 will drop into a notch 60 to cause rotation of the wheel 54 and the dial mechanism a single unit for each reference element that the housing lock dog 49 enters or passes. Hence, the dial 52 provides a readily observable indication of the incremental measuring movements of the housing 26 with respect to the reference means. As will be noted in FIGURE 2, the dial 52 is of the type having double indicia wheels 62 and 63 which, although they rotate in the same directions, have their numerical indicia in reverse order so that the incremental measurements in both directions may be readily noted. It should be understood that any sort of rack and pinion arrangement may be utilized for causing rotation of the dial indicia wheels 62 and 63 in response to incremental movement of the housing 26 relative to the column 20. However, the tooth-and-notch arrangement illustrated is convenient and economical.

In order to provide accurate linear measurements, with effectively infinite resolution, of distances on the workpiece of less than the incremental measurements provided by the reference elements 24, the housing 26 carries pointer means, indicated generally at 64, coupled by means of the cross member 65 to dial indicator means indicated generally at 66. The pointer means 64 includes a pointer rod 67 integrally provided with a scribe 68 at a right angle thereto and having a pointed edge 69 for contact with the workpiece. The pointer rod 67, initially, is vertically slidable within a tube collar 70. The collar 70 is vertically slidable within a sleeve 71, the latter being secured to the housing block 37 by a lock nut 72. The collar 70 is provided with a gear rack 73, and the sleeve 71 is apertured at 74 for access to the gear rack 73 by a pinion 75 on a shaft 76 (see FIGURE 4) provided at its ends with manual knobs 77 and 78. Manual rotation of either knob 77 or 78 causes the collar 70 to move vertically. The collar 70 is threaded at its upper end and is secured to the cross member 65 by a pair of nuts 79 and 80 so that vertical movement of collar 70 by a knob 77, 78 causes vertical movement of the cross member 65. A set screw 81 is threaded through the casing shell 40 and is provided with a turning knob 82 on one end and a nylon pad 83 (see FIGURE 2) at the other end, the nylon pad 83 preferably having a horizontally concave surface for frictionally engaging abutment against the outer surface of the collar 70 whereby the vertical position of the collar 70 may be locked with respect to the housing 26 at any selectively desired position in accordance with the measurement procedure.

The pointer rod 67 is selectively secured to its collar 70 by a novel locking mechanism 84 for selectively locking any cylindrical or tubular member in a fixed position within another tubular member through which the first such member is otherwise freely slidable. This mechanism 84 is the same as the locking means illustrated in FIGURE 9 and used for securing the dial indicator to the housing means, as will be explained hereinafter. The dial indicator means 66 includes a dial indicator or gage 85 of any well known type such as, for example and as illustrated, a Federal dial gage having a pointer 86 rotatable over a dial face 87 bearing numerical indicia (not shown) with the desired fine accuracy of resolution. The dial indicator 85 is integrally provided with a collar 88 through which the usual deflectible means comprising a rod 89 is freely longitudinally movable in both directions (as indicated by the arrows thereon) to cause actuation of the internal dial mechanism for rotating the pointer 86 in proportion to such longitudinal or linear deflection movement. In assembly, the collar 88 is freely slidable within a sleeve member 90 located within the housing 26 and is secured with respect to the sleeve member 90 and the housing 26 by the locking means illustrated in FIGURE 9. The locking means, indicated generally at 91, includes a flat member 92 having a threaded stud 93 at one end and, at the other end, a circular bore 94 partially defined by a pair of spatially separated arms 95 and 96 which are curved toward each other but do not meet so as to prevent damage, as by nicking, to the collar 88 and also to provide desired resiliency in their frictional engagement with the collar 88. The bore 94 has a diameter at least as great as the outer diameter of the sleeve 90 so that the latter may normally freely slide therethrough. The sleeve 90 is provided with a substantially semicircular aperture 97 for permitting passage therethrough of the arms 95 and 96 in movement to the left (FIGURE 1). A cylindrical member 98 has an axial bore 99 for slidably receiving the threaded end 93 of the flat member 92 and has a yoke end 100 with an endwise slot to the depth of the line indicated at 101 for permitting sliding therewithin of the flat portion of the member 92. A nut 102 is threaded onto the stud 93 of the member 92. As seen in FIGURE 1, the slotted yoke end 100 of the cylindrical member 98 abuts against the sleeve 90 so that, upon tightening of the nut 102 onto the stud end 93, the member 92 is drawn toward the left whereby the arms 95 and 96 will pass through the aperture 97 in the sleeve 90 until they contact the collar 88. Upon further tightening of the nut 102, the collar 88 becomes tightly drawn against the sleeve 90, the drawing or compression force being applied by the cylinder end 100 and the arms 95 and 96. Because of the large area and curvilinear nature of the contacts made by the inner surfaces 103 and 104 of the arms 95 and 96, an advantageously greater holding force can be applied than is possible with the ordinary set screw of the prior art, and the surface of the collar 88 is not dented, nicked, scratched or otherwise marred or damaged, thus retaining the original smooth surface of the collar 88 for innumerable locking operations without the common undesirable detent effects.

The cross member 65 is provided with a vertical member 105 for vertical movement (as indicated by the arrows thereon) in accordance with the same movement by the pointer means 64 relative to the housing 26. The vertical member 105 is provided integrally with a foot 106 which is abuttingly engageable with the deflection rod 89 of the dial indicator means whereby relative movement of the pointer means 64 with respect to the housing means 26 causes actuation movement of the deflection rod 89 for operating the dial indicator 85.

Referring to FIGURES 10 to 17, inclusive, wherein is illustrated a second embodiment of the present invention, the same reference numerals (sometimes primed) indicate elements which are the same or similar to those previously described. The base plate 22 is provided with a threaded hole 107 into which the threaded end 21 of the structural support column 20 is screwed for mounting thereto, a lock nut 108 being provided. A gear rack 60' is provided on the support column 20 for engagement with the pinion 54' of the dial means. The reference means comprises a separate tube 109 having a longitudinal bore 23 within which are contained the longitudinally incremental reference means comprising a single reference rod 110 having reference portions 24' and 25' to provide 1" incremental steps in the position of the housing means 26 with respect to the reference means and the workpiece. Each of the reference element portions 24' and 25' has a circular cross-section and is provided with a flat top surface portion 27' and a conical chamfer 29, the latter permitting access to the top surface portion 27' of the reference element portion 24' or 25' next therebelow.

The housing 26 is provided with a longitudinal bore 111 into which a cylindrical sleeve 112 is press-fit, the sleeve 112 having an internal bore surface 113 for slidable engagement with the support column 20. The housing 26 is provided with a second longitudinal bore 114 parallel to the first bore 111 and into which a second cylindrical sleeve 115 is press-fit, the sleeve 115 having an internal bore surface 116 for freely slidable engagement with the reference column tube 109. Thus, the reference means are always in parallel relationship to the support column 20, although separate therefrom, to give the same functional effects obtained in the first embodiment described hereinabove.

A block 117 fits upon the upper end of the support column 20 and is secured thereto by a set screw 118. The block 117 has a bore 119 through which the upper end of the reference rod 110 is freely slidable. A leaf spring 120 is disposed upon the top surface of the block 117 to normally cover the bore 119 for resiliently limiting upward movement of the reference rod 110 and is pivotally secured to the block 117 by means of a washer 121 and a knurled-head machine screw 122.

The manually operated housing lock 43' includes a cylindrical plunger 123 which is yoked to pass around the tube 109 and has a diametrically secured plate or dog 49' for insertion through the apertures, such as 124, in the reference tube 109 to make registration engagement with the reference element surfaces 27'. A spring 44' is compressed between a plug 125, which is press-fit into the housing 26, and the dog 49' so that the housing lock 43' is normally maintained in the engaged or rightward direction (FIGURE 16). Thus, by depressing the plunger 123 so as to move the locking dog 49' away from engagement with the reference means, the housing 26 and all of the elements carried thereby become freely slidable in both the upward and downward longitudinal direction with respect to the support column 20 and the reference means and, upon release of the housing lock 43' at any selected incremental position of the housing 26 in the longitudinal direction, the locking dog 49' registers with the top surface 27' of the reference element portion 24' next therebelow.

Referring to FIGURE 18, there is seen a modified pointer means adapted primarily for measuring distances between curved surfaces, as in measuring diameters of circular members. A pointer rod 126 has a lateral aperture 127 for receiving one end of an arm member 128 which is secured to the rod 126 by a set screw 129. The other end of the arm member 128 is provided with a convex tip 130 which is directed upwardly (as shown) or downwardly by merely reversing the attitude of the arm member 128 in the aperture 127. Internal threads 131 in the end of the pointer rod 126 permit threaded insertion of an extension rod (not shown) to provide greater length or "reach" for the pointer means. Thus, the base plate 22 may be positioned at any convenient location on or adjacent to the workpiece, with the pointer rod being able to reach below the base plate 22 through the hole 132 therein, with the arm member 128 passable through the opening 133 which communicates with the hole 132. Obviously, the insertable and replaceable arm member 128 may be in the form of the scribe 68.

While particular embodiments of the present invention have been shown and described, it will be obvious to those skilled in the art that changes and modifications may be made without departing from this invention in its broader aspects, and, therefore, the aim in the appended claims is to cover all such changes and modifications as wall within the true spirit and scope of this invention.

What is claimed is:

A linear measuring device comprising:
base means;
vertical support means secured in an upright position to said base means;
housing means mountable about said support means in vertically slidable relationship thereto;
said support means including incremental reference means parallel thereto and directly referable to a workpiece;
selectively engageable means for securing said housing means to said reference means for vertical support thereby at any selected increment thereof;
dial means mounted on said housing means;
said support means having registration means corresponding to said incremental reference means;
selectively disengageable pinion means intercoupling said dial means with said registration means whereby said dial means is settable to zero initial reference and relative incremental vertical movement of said housing means with respect to said support means causes corresponding changes in the visible indicia of said dial means;
pointer means slidably mounted on said housing means for vertical movement;
a removable dial indicator secured to said housing means and having vertically operable deflectible means; and
a cross member selectively securable to said pointer means and having projection means engageable with said deflectible means whereby relative movement of said pointer means with respect to said housing means causes actuation movement of said deflectible means.

References Cited by the Examiner

UNITED STATES PATENTS

| 367,473 | 8/87 | Tickell | 33—165 |
| 515,236 | 2/94 | Lavigne | 33—170 |
| 1,932,626 | 10/33 | Horan | 33—169 X |
| 2,144,972 | 1/39 | Hirst | 33—165 |
| 2,400,715 | 5/46 | Sandberg | 33—170 |
| 2,421,440 | 6/47 | Thorpe | 33—165 |
| 2,910,779 | 11/59 | Patton | 33—170 |
| 2,926,426 | 3/60 | Lury | 33—169 |

FOREIGN PATENTS

| 873,447 | 4/53 | Germany. |
| 878,103 | 9/61 | Great Britain. |
| 229,451 | 1/44 | Switzerland. |
| 230,727 | 4/44 | Switzerland. |

ISAAC LISANN, *Primary Examiner.*

ROBERT L. EVANS, *Examiner.*